J. KENNEDY.
ROLLING MILL.
APPLICATION FILED AUG. 24, 1917.
1,284,195.
Patented Nov. 5, 1918.
12 SHEETS—SHEET 10.
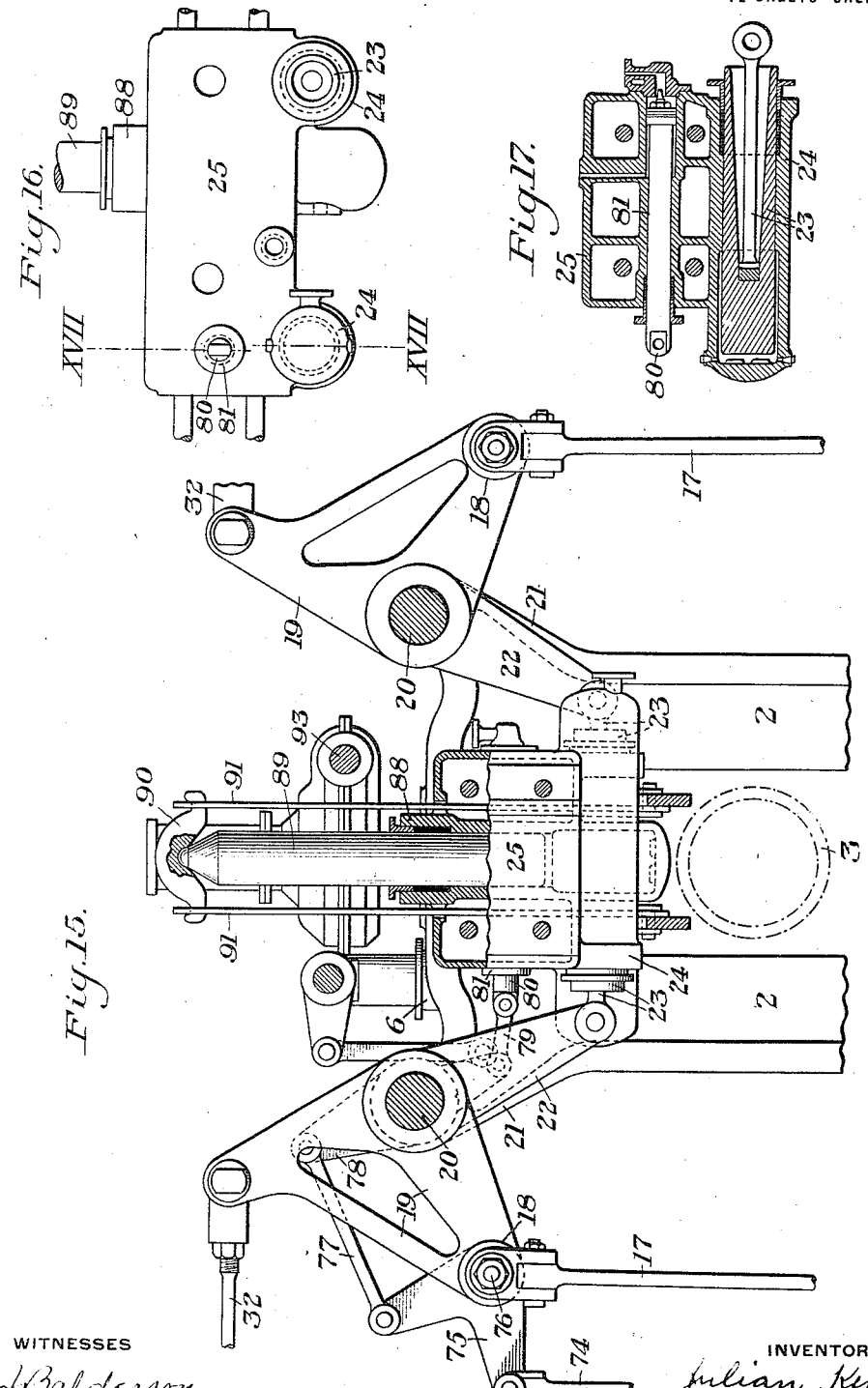
WITNESSES
R H Balderson
INVENTOR
Julian Kennedy
by Bakewell, Byrnes & Parmelee,
Attys.

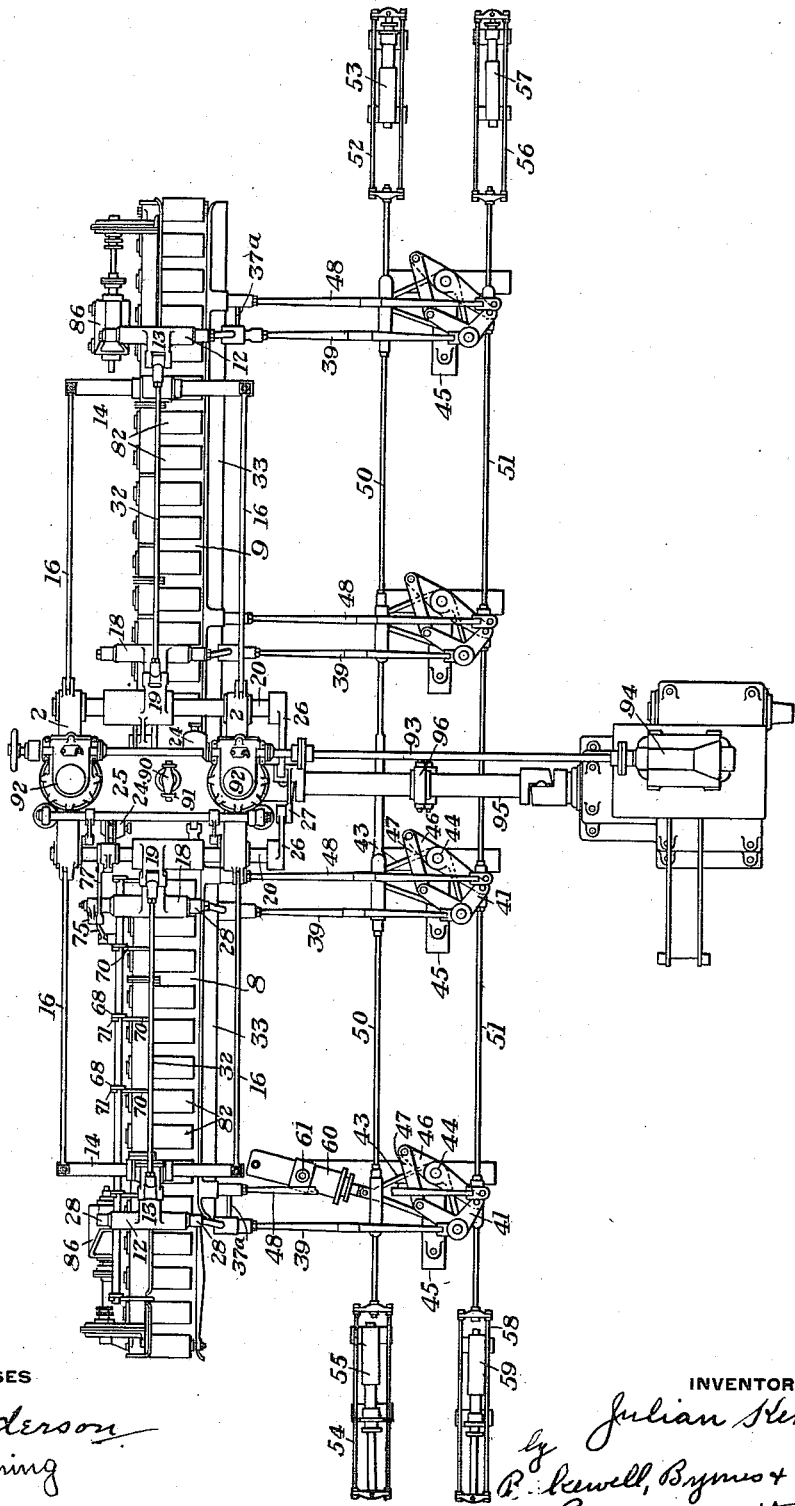

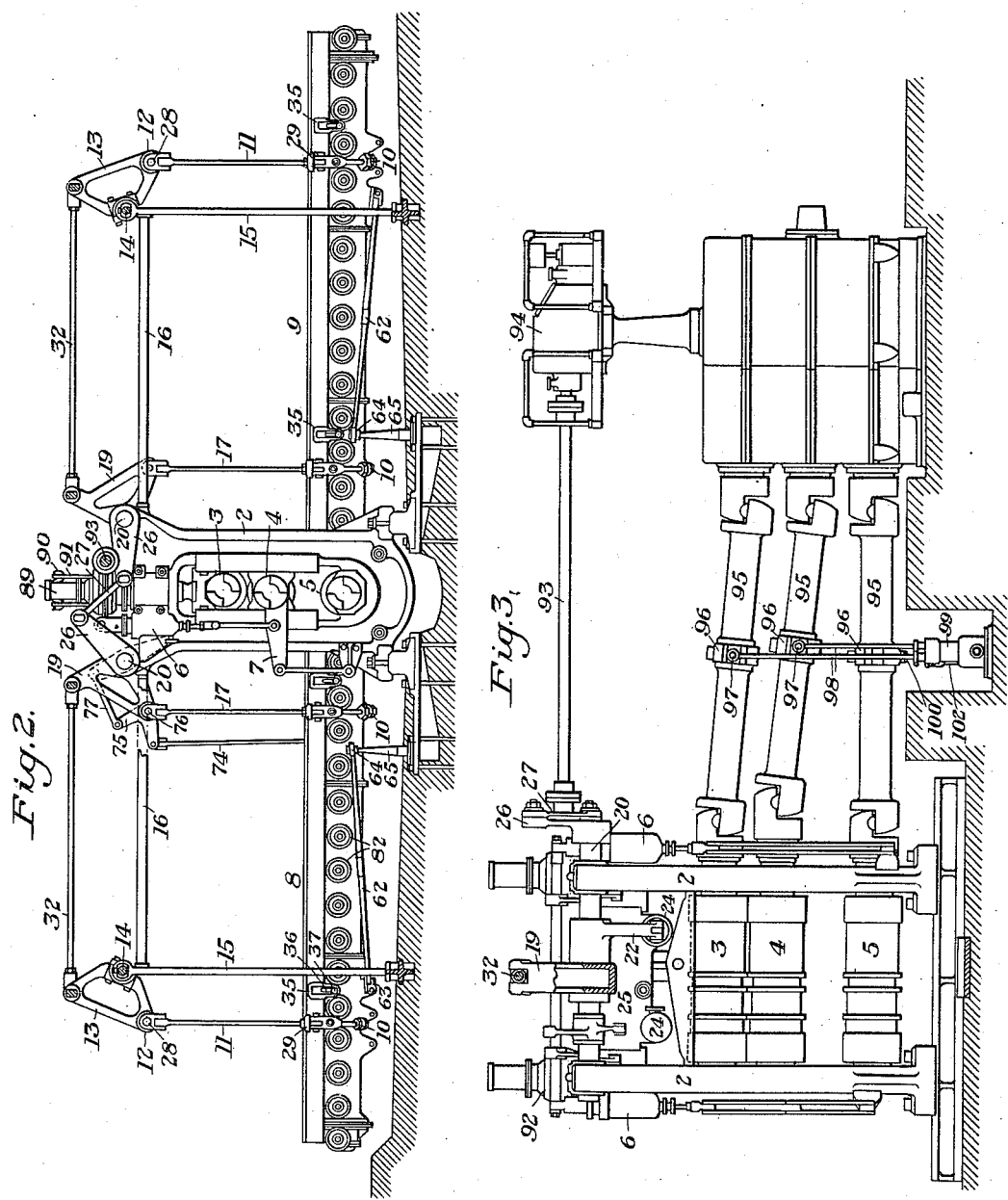

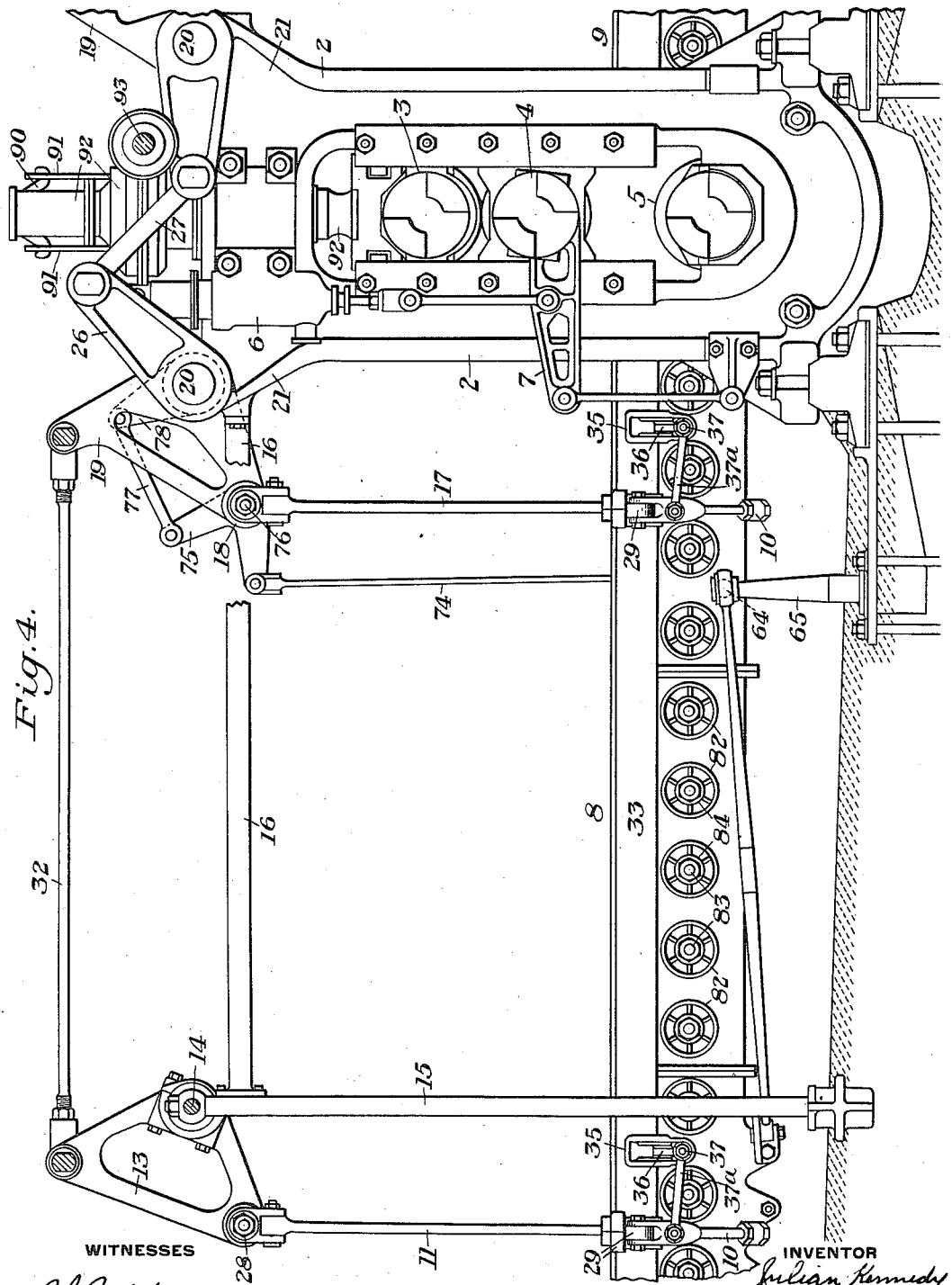

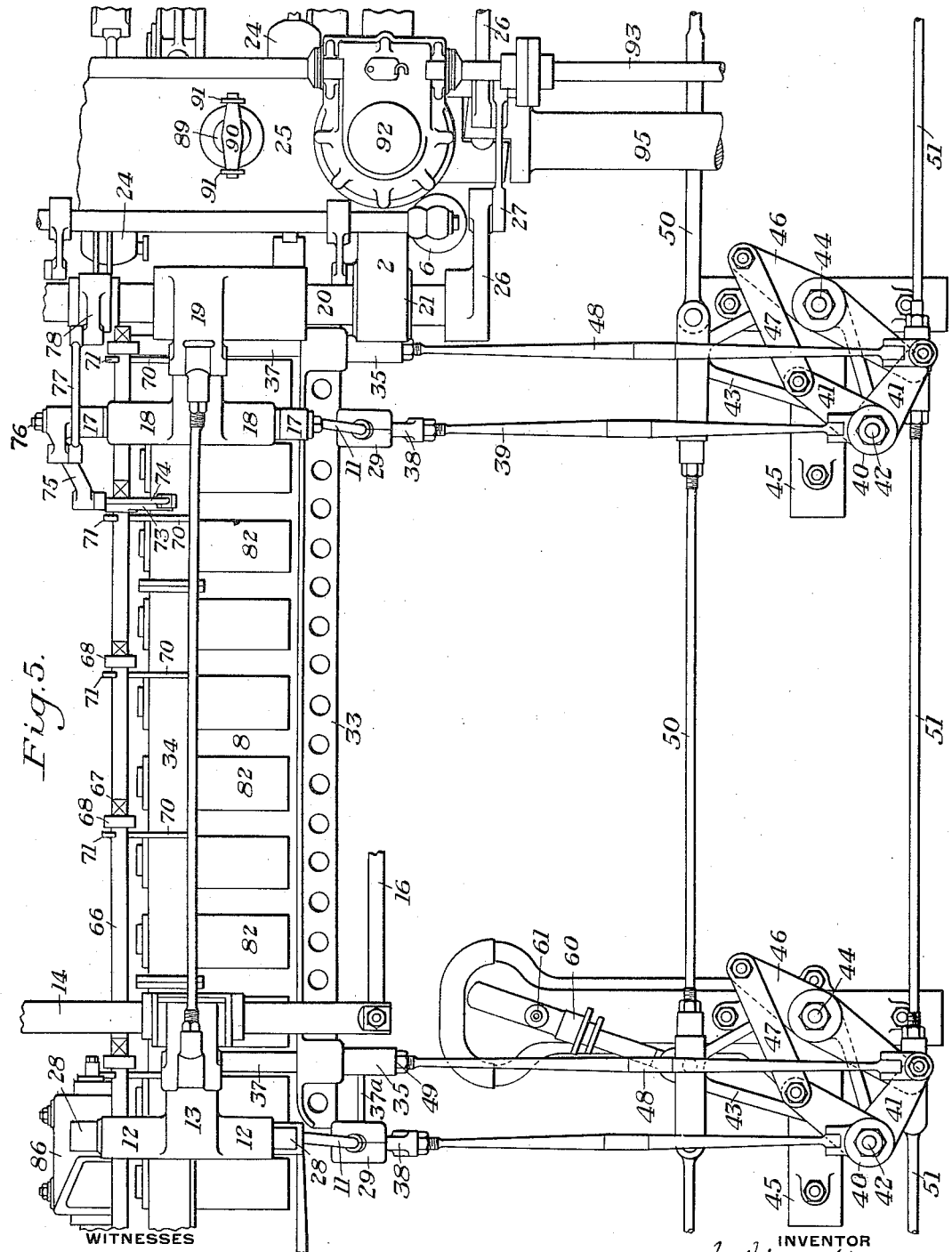

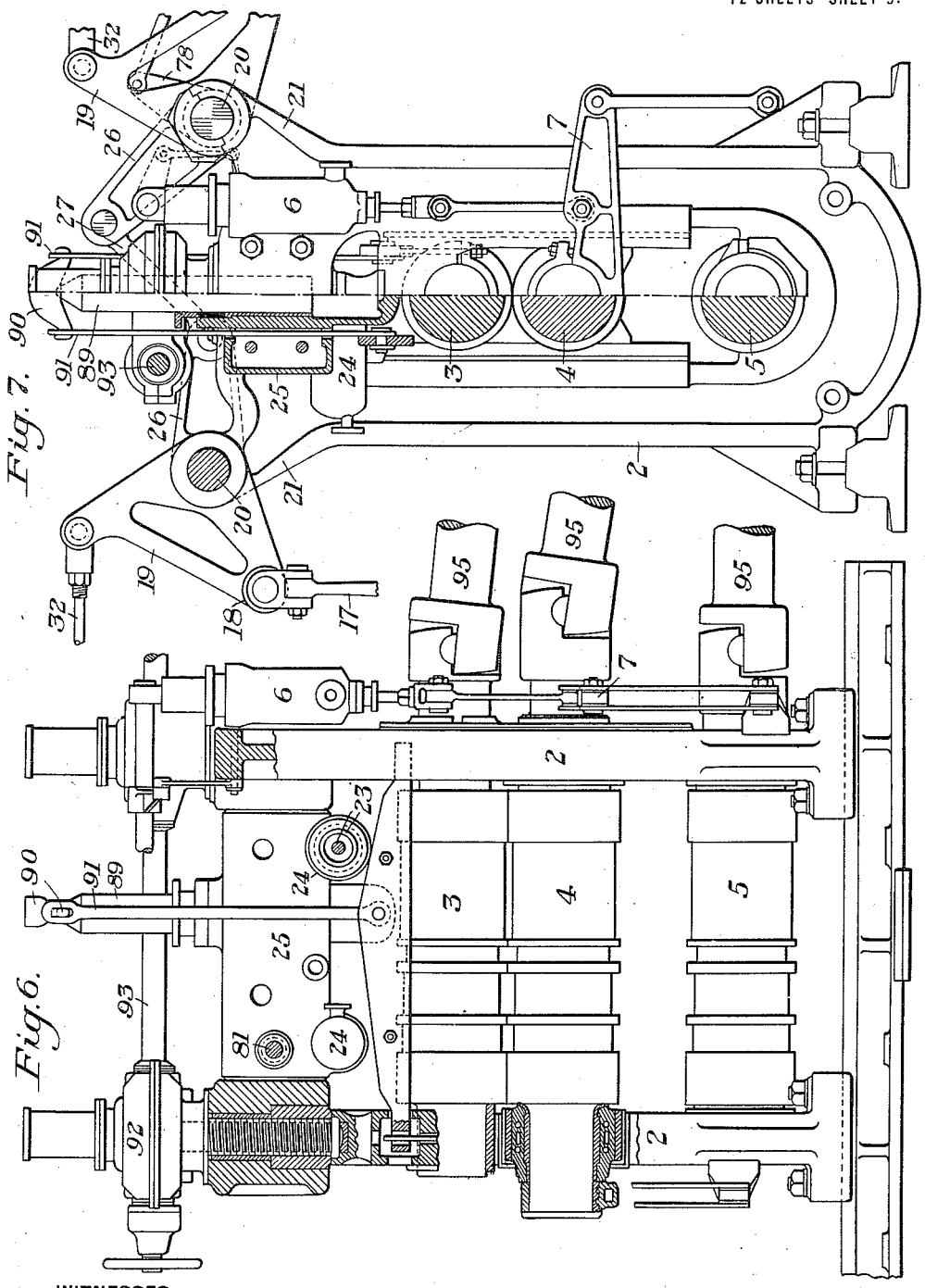

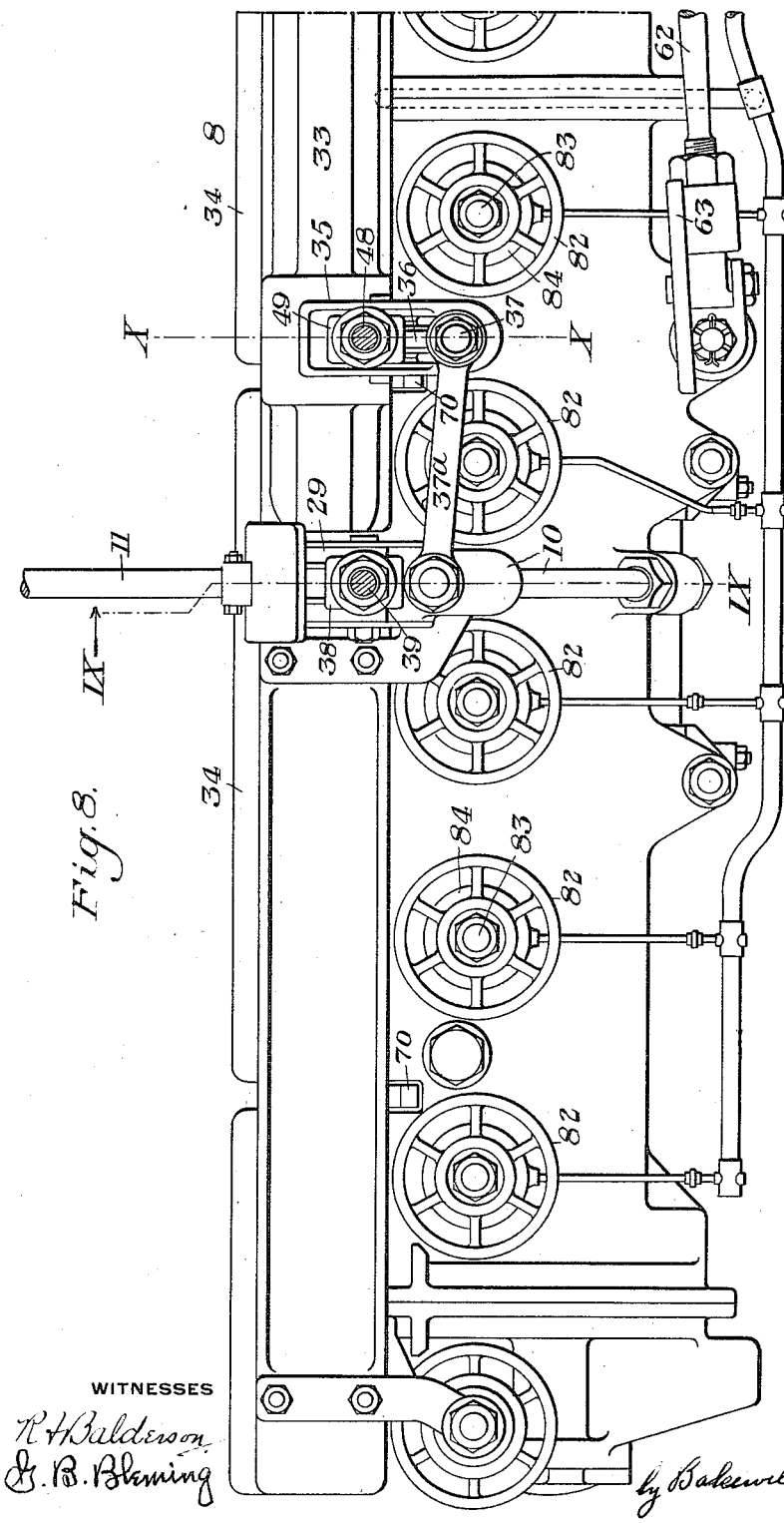

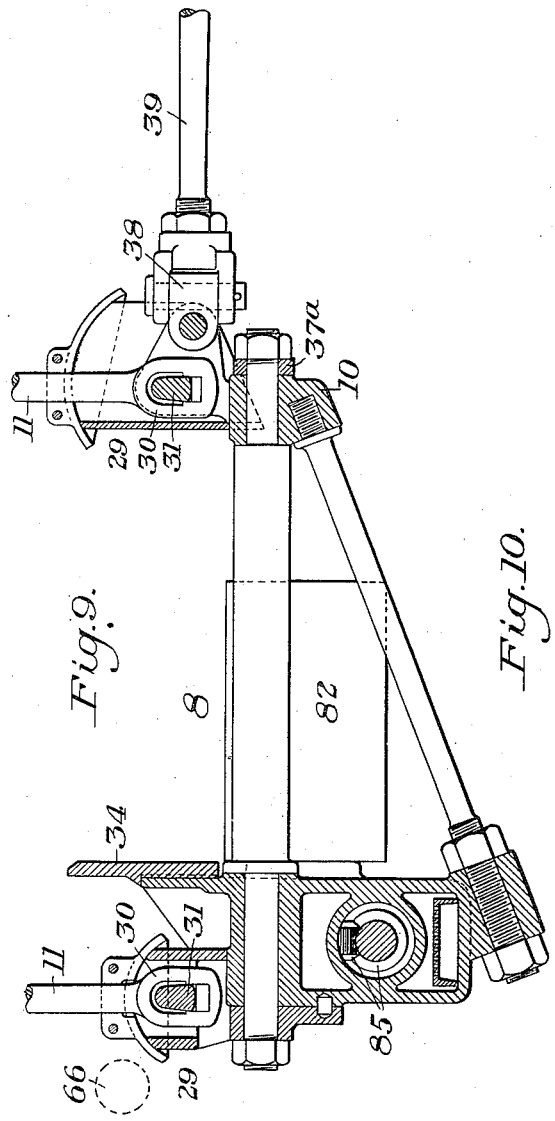
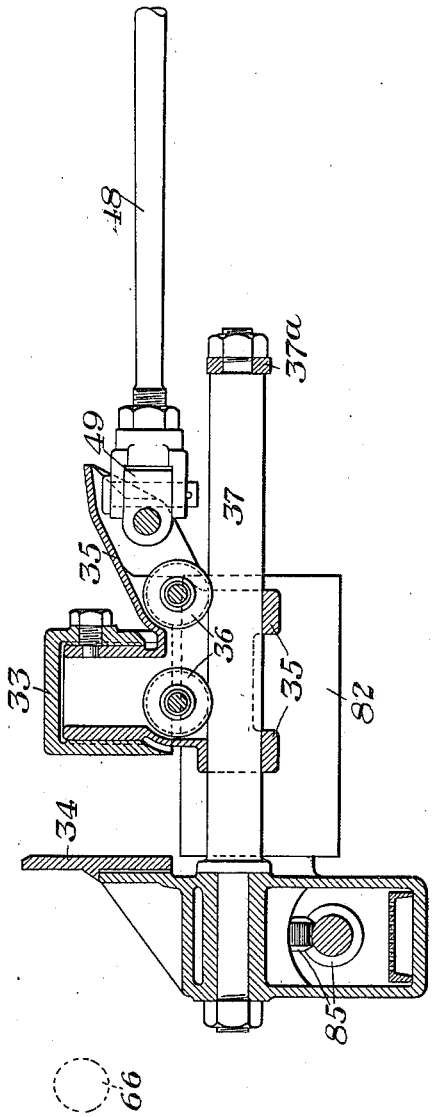

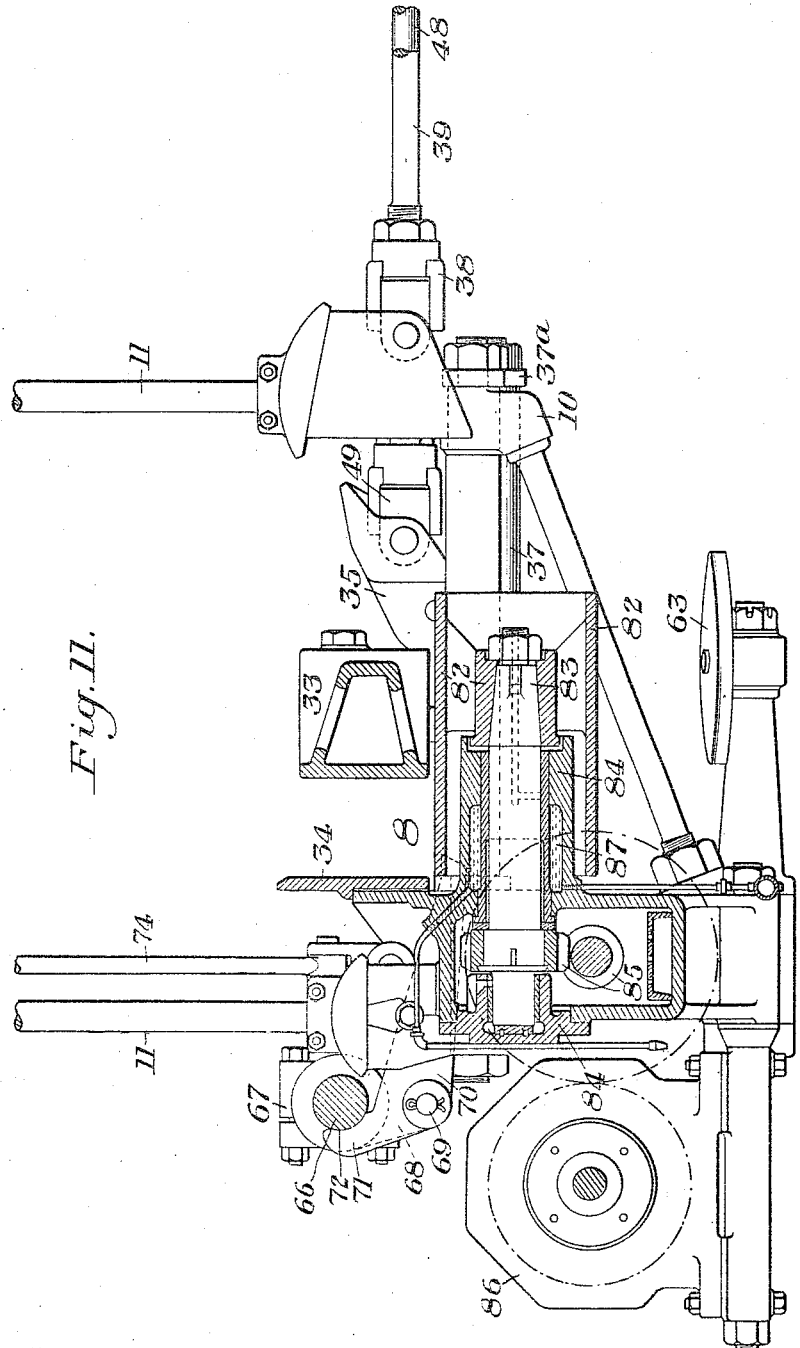

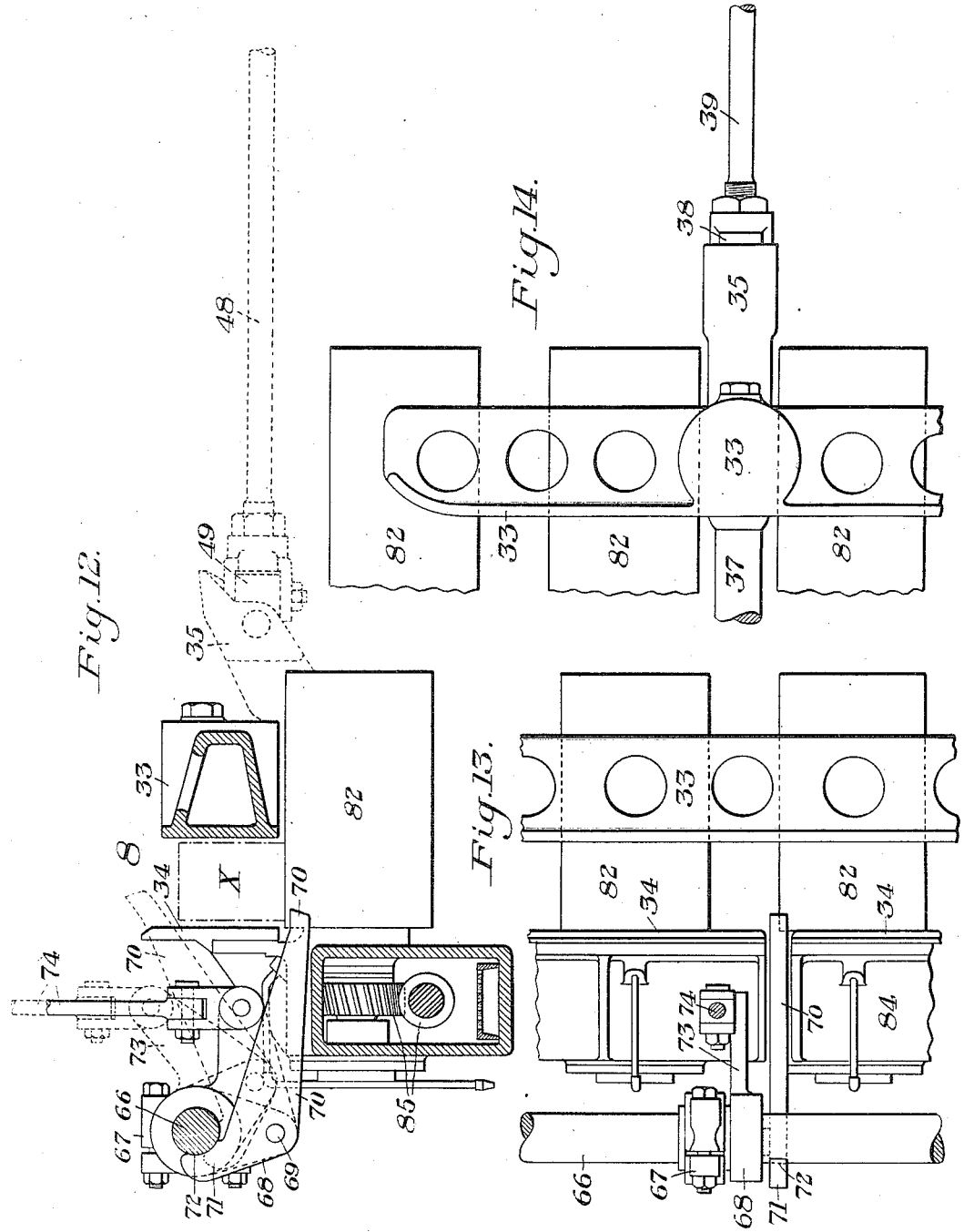

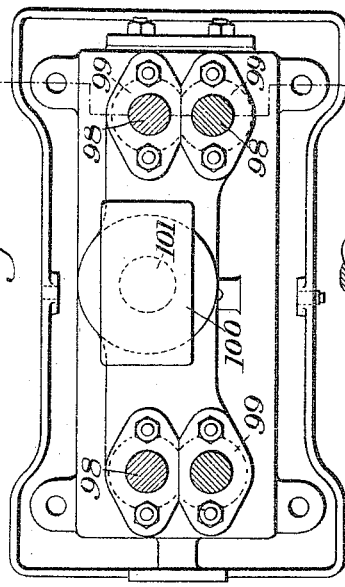
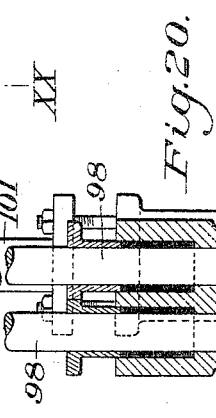
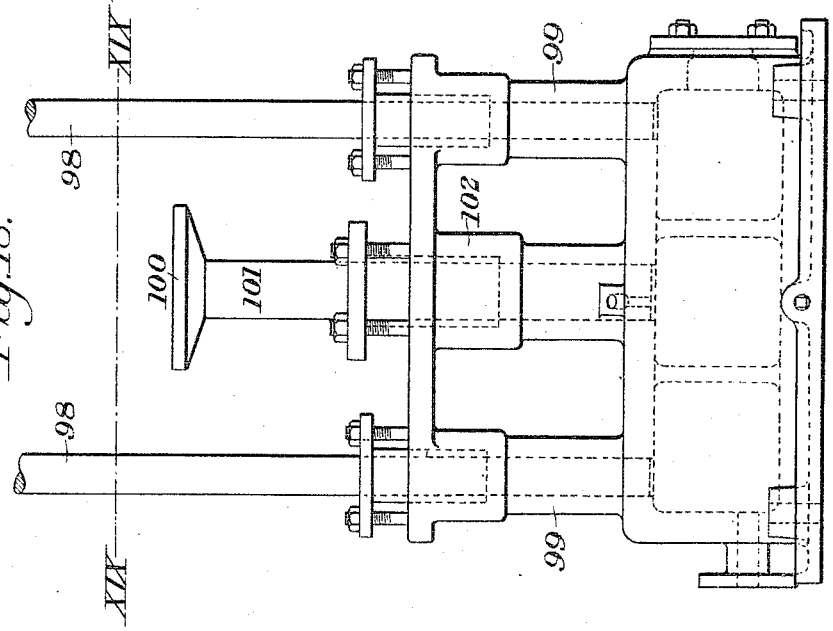

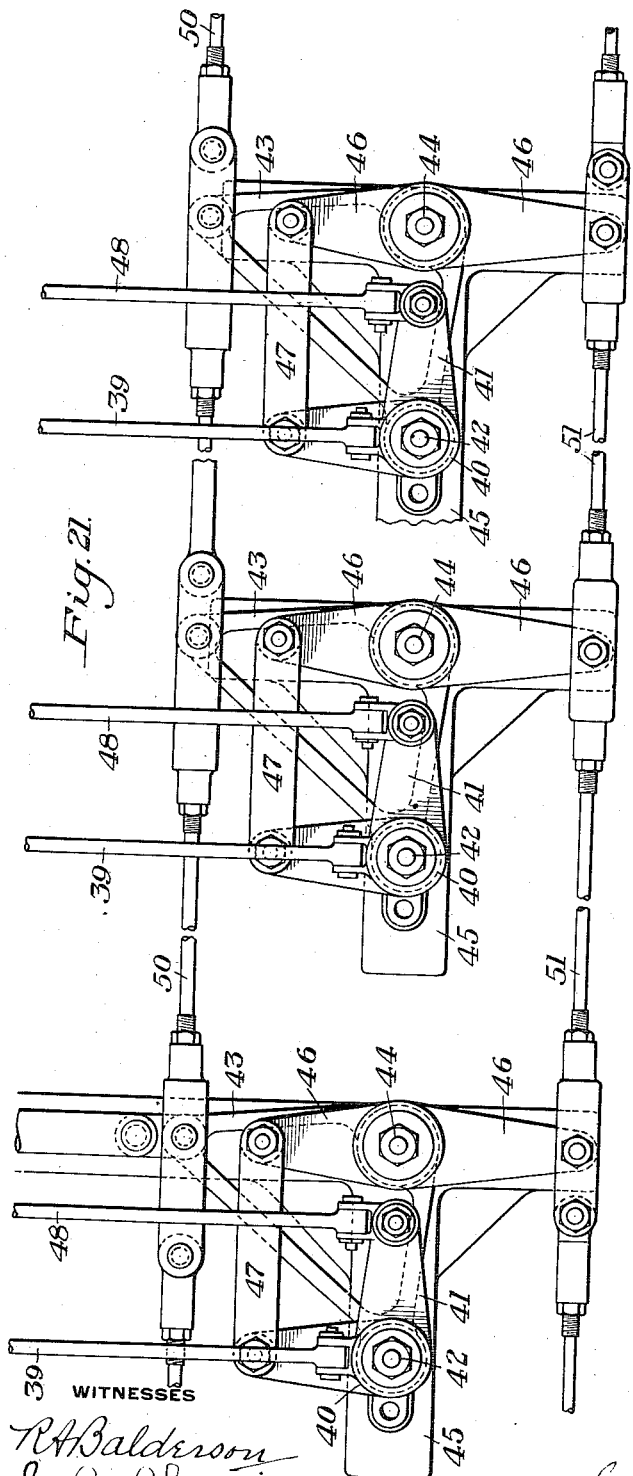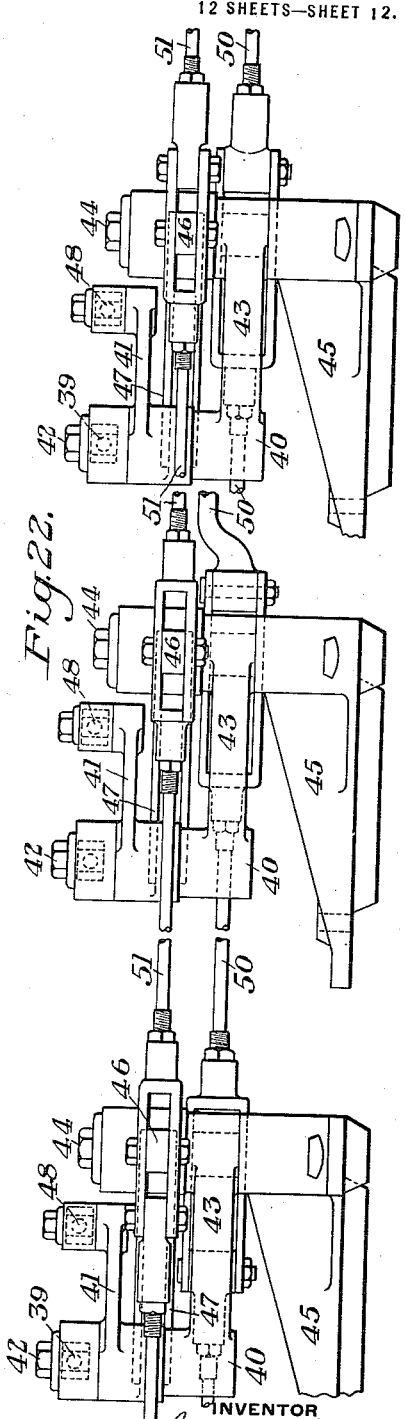

UNITED STATES PATENT OFFICE.

JULIAN KENNEDY, OF PITTSBURGH, PENNSYLVANIA.

ROLLING-MILL.

1,284,195. Specification of Letters Patent. Patented Nov. 5, 1918.

Original application filed April 21, 1916, Serial No. 92,614. Divided and this application filed August 24, 1917. Serial No. 187,954.

*To all whom it may concern:*

Be it known that I, JULIAN KENNEDY, a citizen of the United States, residing at Pittsburgh, in the county of Allegheny and State of Pennsylvania, have invented a new and useful Improvement in Rolling-Mills, of which the following is a full, clear, and exact description, reference being had to the accompanying drawings, forming part of this specification, in which—

Figure 1 is a plan view of a rolling mill embodying my invention.

Fig. 2 is a view of the same partly in section and partly in side elevation.

Fig. 3 is an end view of a portion of the mill.

Fig. 4 is a side elevation on a larger scale of a portion of the mill.

Fig. 5 is a plan view on a larger scale of a portion of the mill.

Fig. 6 is a view partly in end elevation and partly in vertical section showing the rolls and their housings.

Fig. 7 is a view partly in vertical section and partly in side elevation of the rolls and their housings.

Fig. 8 is a side elevation of another portion of the mill.

Figs. 9 and 10 are sectional views taken respectively on the lines IX—IX and X—X of Fig. 8.

Fig. 11 is a transverse section through the roll table, the manipulator guides, etc.;

Fig. 12 is a detail view showing partly in section and partly in elevation some of the parts shown in Fig. 11.

Figs. 13 and 14 are fragmentary plan views or portions of one of the roll tables;

Fig. 15 is a sectional elevation showing a portion of the table and manipulator-actuating mechanisms.

Fig. 16 is a side elevation of the housing head block removed.

Fig. 17 is a section on the line XVII—XVII of Fig. 16.

Fig. 18 is an end elevation of the cylinders for operating the roll spindles.

Fig. 19 is a section on the line XIX—XIX of Fig. 18.

Fig. 20 is a section on the line XX—XX of Fig. 19.

Fig. 21 is a plan view of a portion of the table and manipulator-actuating mechanisms; and Fig. 22 is a side elevation of the same.

My invention has relation to rolling mills, and more particularly to table mechanism therefor.

In accordance with my invention, I provide roll tables which are movable both laterally and vertically opposite different passes of the mill, together with actuating mechanism of novel character for moving the tables from one position to another. My invention also provides improved manipulator and guide mechanism movable vertically with the table and also capable of certain relative movements with respect thereto.

The invention also has reference to various other minor features of the mill, as will hereinafter more fully appear.

Referring to the accompanying drawings, in which I have shown the preferred embodiment of my invention, the numeral 2 designates the end housings of a three-high mill, 3 the upper roll therefor, 4 the middle roll, and 5 the lower roll. The middle roll may be moved vertically by any suitable means, such as the cylinders 6, having their plungers connected to the lever arms 7, which carry the bearings for this roll. The details of this mechanism form no part of the present invention, since any suitable means may be provided for shifting the middle roll.

The numeral 8 designates the roll table at one side of the mill and 9 a similar roll table at the opposite side of the mill. Each of these tables is carried by stirrups or saddles 10. The stirrup at the outer end portion of each table is suspended by means of two links 11, which are connected at their upper ends to lateral extensions 12 (see Fig. 5) of one arm of a bell crank lever 13. Each of these bell crank levers is pivoted upon a transverse rod or shaft 14, which is carried upon vertical posts 15, having braces 16 connecting them with the roll housings. The stirrup or saddle at the inner end portion of each table is similarly suspended by means of two links 17, connected at their upper ends to lateral projections 18, of one arm of a bell crank lever 19, which is sleeved upon a transverse shaft 20. Each of these shafts 20 is supported in bearings in projections 21 of the roll housings. Each of said shafts has rigidly secured thereto a depending crank arm 22 (best shown in Fig. 15) and which is connected at its lower end portion with the plunger 23 of a hydraulic cylinder 24. These two cylinders are formed in a housing head block 25 (shown in detail in Figs. 16 and 17). The two cylinders 24 have their plungers extending in opposite directions, each plunger being connected to the arm 22 of one of the shafts 20. Each of said shafts also preferably has rigidly secured thereto a crank arm 26, these two crank arms being connected by a link 27 (see Figs. 2 and 4) whereby the action of the two cylinders 24 is equalized.

Each of the suspension links 11 has a pivotal connection 28 at its upper end with one of the bell cranks 13 or 19, and at its lower end has a universal jointed connection at 29 with the stirrup or saddle 10. These universal jointed connections may be of any desired character. One form of such connection is shown in detail in Fig. 9. In this figure, the links 11 are shown as having loops 30 at their lower ends, the openings of which loosely engage the portions 31 of the stirrups or saddles.

Each pair of bell cranks 13 and 19 is connected by a link 32.

From the foregoing description and from the drawings, it will be apparent that each of the roll tables is suspended by four links from one pair of the connected bell cranks 13 and 19, and that the two sets of bell cranks are actuated in unison by the cylinders 24, to raise or lower the tables so as to bring them into proper position with respect to the passes between either the top and middle roll or between the middle and bottom roll.

The roll tables are preferably made narrower than the length of the middle rolls and are arranged to be shifted laterally in the direction of the transverse axes of the middle rolls in the manner presently described. Each table is also provided with the guides 33 and 34. Each of the guides 33 is mounted for lateral movement relatively to the table and toward and away from the guide 34. For this purpose, each of the guides 33 is provided with carriage portions 35, preferably provided with rollers 36 (see Fig. 10) these rollers being arranged to travel on the transverse guide 37. The guides 34 are fixedly secured to the table to move therewith. The outer ends of the guides 37 may be braced, as indicated at 37ª.

For the purpose of shifting the tables laterally and for moving the guides 33 relatively to the rolls of the table, I provide the mechanism now to be described.

Connected to each table by means of universal joints 38 (see Fig. 9) are two laterally extending rods 39, which at their opposite ends are each connected to the hub portion 40 of a bell crank lever 41, (see Figs. 5, 21 and 22). Each bell crank lever 41 is pivoted at 42 upon one arm of a triangular lever 43, which, in turn, is fulcrumed at 44 on a supporting bracket 45. Also mounted on the center 44 is a two-armed lever 46, one arm of which is connected by a link 47 with one of the arms of the bell crank lever 41. Connected to the other arm of each bell crank lever 41 is a link rod 48 which, at its opposite end, is connected by a universal joint 49 with one of the carriages 35 of the guide 33. All the triangular levers 43 are connected into a continuous system by a system of connecting rods 50, and all the arms of the two armed levers 46 opposite the link connections 47 are similarly connected by a system of rods 51. The rods 50 are connected at one end to a yoke 52, which is actuated by the plunger of a power cylinder 53, and at the opposite end are similarly connected to a yoke 54, actuated by a plunger of the power cylinder 55. In a similar manner, the rods 51 are connected at one end with a yoke 56, actuated by the plunger of the power cylinder 57, and at the opposite end to the yoke 58, actuated by the plunger of the power cylinder 59. The general arrangement of this system and of its actuating cylinders is best shown in Fig. 1. The cylinders 53, 55, 57 and 59 are single-acting cylinders. By admitting power to the cylinder 53 or to the cylinder 55, the triangular levers 43 will all be rocked in unison on the center 44 in one direction or the other, according to which cylinder is operated. This actuates the connecting rods 39 and 48 to simultaneously move the table and its guide 34 and also the guide 33 to which the rods 48 are connected. In this movement, the bell crank levers 41 move with the triangular levers 43, on which they are mounted. Power may also be admitted to either cylinder 57 or 59, to thereby rock the levers 46 on the centers 44, and thereby, through the connections 47 and bell cranks 41, adjust the guides 33 with respect to the guides 34.

60 designates a counterbalance cylinder which is preferably connected to at least one of the triangular levers 43 for the purpose of steadying the movement of the system. This cylinder is shown in Figs. 1 and 5. It is swiveled on a vertical axis at 61 so as to adapt itself to the movements of the said lever. For the purpose of steadying and guiding the tables in their lateral movements, each table is preferably provided with a radius bar 62, swiveled at one end to the table at 63, and having a ball-and-socket connection at its opposite end at 64 with a suitable supporting post 65, set in the foundation of the mill.

The numeral 66 designates a manipulator shaft which is journaled in bearings 67 on the roll table 8. This shaft has a plurality of crank arms 68, to each of which is pivoted at 69 a manipulator finger 70 (see Figs.

11, 12 and 13). Each of these fingers 70 has an extension 71 back of its pivot 69, and each such extension has a concavity 72, in its heel portion, which is shaped to fit a portion of the periphery of the shaft 66. These manipulator fingers are arranged to oscillate on the centers 69 through slots in the guide 34. In their normal lowered positions, they are in the positions shown in full lines in Figs. 11 and 12, their free end portions lying underneath and in position to catch and turn the blank or work piece X (Fig. 12) which is being rolled and which is between the guides 33 and 34.
The shaft 69 is operated as follows: It is provided with a crank arm 73 (Figs. 5 and 12), to which is jointed the lower end of a connecting rod 74, whose upper end is connected to one arm of a bell crank lever 75, which is fulcrumed at 76 to one arm of one of the bell crank levers 19, above described. The other arm of the bell crank lever 75 is connected by link 77 with one arm of a lever 78, which is loosely fulcrumed on the shaft 20, before described (see Fig. 15). The other arm of the lever 78 is connected by a link 79 with the plunger 80 of a power cylinder 81, which is also formed in or carried by the head block housing casting 25, before referred to.

When power is admitted to this cylinder 81, the lever 78 is thereby actuated to actuate the bell crank lever 75 and rock the manipulator shaft 66. As the shaft 66 is rocked, the crank arms 68 are moved from the position shown in full lines to the position shown in dotted lines in Fig. 12, thereby carrying the manipulator fingers forwardly and upwardly through the slots in the guide 34, and by reason of the engagements of the heel portions of these fingers with the shaft 66, the fingers are caused to move upwardly as they are moved forwardly, thereby actuating and turning the work piece. When the action of the cylinder 30 is reversed, the fingers are moved back to the position shown in full lines in Fig. 12.

Inasmuch as the bell crank 75 is carried by one of the bell cranks 19, the relation of the parts is not changed in a manner to affect the operation of the shaft 66 when the table 8 is raised or lowered. The movement of the manipulator fingers described is an exceedingly simple and effective one, by reason of the provision of the fulcrums at their heel portions against the shaft 66, which gives them a powerful lifting and turning action.
The roll tables may be of any suitable or usual construction. In Fig. 11, I have shown the manner in which the rolls may be journaled. One of these table rolls is shown at 82, and is secured to an overhung spindle 83, supported in bearings 84, and driven by suitable gear connections 85 with an electric motor 86. 87 indicates a water-cooling system for the rolls.

The housing head block 25, before referred to, preferably consists of a single casting which is bolted rigidly between the end housings and which, as above stated, carries or has formed therein the two cylinders 24 and also the cylinder 81. This casting also preferably carries or has formed therein a cylinder 88, whose plunger 89 actuates the yoke 90 which carries the roll counterbalance 91. In this manner, all the power cylinders for raising and lowering the table, for shifting the middle roll, for actuating the manipulator fingers, and for the roll counterbalance may be carried or contained in this head block.

The numeral 92 designates the usual screw-down mechanism for the rolls, which may be actuated in any usual or suitable manner, as by the shaft 93, driven by the motor 94.

The numeral 95 designates the driving spindles for the rolls 3, 4 and 5. I preferably provide a system of supporting cylinders for these spindles, this system also providing means whereby the angle of the spindles may be shifted to suit the adjustment of the rolls. This supporting system is shown generally in Fig. 3, and some of the details thereof are shown in Figs. 18, 19 and 20. Each spindle 95 is provided with a yoke 96, in which it rotates, having laterally projecting studs or trunnions 97, which engage the bearings in the upper ends of the piston rods 98 of the hydraulic cylinders 99. Two of these rods are provided for the yoke of each of the upper and middle spindles 95, each rod having its own actuating cylinder 99. The lower spindle 95 has its yoke 96 carried by a saddle 100, which, in turn, is carried by the piston 101 of a power cylinder 102.

My invention provides a system of floating tables which are capable of being readily shifted vertically into the desired positions relative to the roll passes and in which the supporting and actuating parts are carried largely on the main housings of the mill. It also enables the use of relatively narrow tables, which can be shifted laterally as well as vertically, together with a simple and efficient arrangement of guides and manipulators which can be readily controlled and actuated.

I do not desire to limit myself to the particular construction, arrangement and combination of parts which I have herein shown and described, since it will be obvious that various changes may be made therein, without departing from the spirit and scope of my invention as defined in the appended claims. Thus, under the broader claims herein, the particular method of supporting the tables and the actuating connections therefor may be widely varied. The tables themselves may be constructed in various ways, and various other changes may be made in the different details.

The present application is a division of my pending application Serial No. 92,614, filed April 21, 1916; and the novel features of the mill not herein claimed are claimed in said application and also in other pending divisions thereof.

I claim:

1. In a rolling mill, a roll table supported for lateral movement, a relatively fixed guide carried by the table, another guide movable independently of the table toward and away from the fixed guide, and actuating mechanism for moving the table, said mechanism also having means for moving the movable guide simultaneously with the table, substantially as described.

2. In a rolling mill, a roll table supported for lateral movement, a relatively fixed guide carried by the table, another guide movable independently of the table toward and away from the fixed guide, and actuating mechanism for moving the table, said mechanism also having means for moving the movable guide simultaneously with the table, together with actuating connections whereby the movable guide may be shifted independently toward and away from a relatively fixed guide, substantially as described.

3. In a rolling mill, a roll table supported for lateral movement, a relatively fixed guide carried by the table, another guide movable independently of the table toward and away from the fixed guide, and actuating mechanism for moving the table, said mechanism also having means for moving the movable guide simultaneously with the table, together with actuating mechanism connected with said means for independently shifting the movable guide toward and away from the fixed guide, substantially as described.

4. In a rolling mill, a roll table supported for lateral movement, a relatively fixed guide carried by the table, another guide movable independently of the table toward and away from the fixed guide, and actuating mechanism for moving the table and also for moving the second named guide either with the table or independently thereof, said actuating means being at one side of the table and supported independently thereof, substantially as described.

5. In a rolling mill, a roll table supported for lateral movement, a relatively fixed guide carried by the table, another guide movable independently of the table toward and away from the fixed guide, a lever system having actuating connections with the table, another lever system having actuating connections with the movable guide and connected with the first named system to be actuated thereby and also to operate independently thereof, and separate motive devices for the two systems, substantially as described.

6. In a rolling mill, the combination with a roll table suspended to swing laterally from overhead points of support, and a relatively fixed guide carried by the table, of another guide movable independently of the table toward and away from the first named guide, and actuating mechanism for moving the table, said mechanism also having means for moving the movable guide simultaneously with the table, substantially as described.

7. In a rolling mill, the combination with a mill table supported for lateral movement and having guides both of which are movable with the table and one of which is mounted for independent movement toward and away from the other guide, of actuating connections for the table and for the last named guide, motive means for simultaneously actuating the connections of both the table and the independently movable guide, and other motive means for separately actuating the connections of the independently movable guide, substantially as described.

8. In a rolling mill, the combination with a roll table suspended to swing laterally from overhead points of support, a relatively fixed guide carried by the table, of another guide movable independently of the table toward and away from the first named guide, and actuating mechanism for moving the table and also for moving the movable guide simultaneously with the table and also independently thereof, substantially as described.

9. In a rolling mill, the combination with a table mounted for lateral movement and having a pair of guides movable therewith, one of said guides also having an independent movement and the other of said guides being stationary relatively to the table, of a lever system having actuating connections with the table and also with the independently movable guide and having means whereby the table and both guides may be shifted simultaneously or the independently movable guide may be independently shifted, substantially as described.

10. In a rolling mill, the combination with a table mounted for both lateral and vertical movements, of guides and manipulator mechanism movable with said table, said manipulator mechanism having means for turning the work-piece on the table between the guides, substantially as described.

11. In a rolling mill, the combination with a table mounted for both lateral and vertical movements, of guides and manipulator mechanism movable with said table, said manipulator mechanism having means for turning the work-piece on the table between the guides, one of said guides also having an independent movement, substantially as described.

12. In a rolling mill, the combination with a laterally movable table, of a manipulator carried by said table and movable therewith, said manipulator having means for turning the work-piece on the table, and means for actuating the manipulator in the different adjusted positions of the table, substantially as described.

13. In a rolling mill, the combination with a table mounted for both lateral and vertical movements, of a manipulator carried by said table and movable therewith, said manipulator having means for turning the ingot upon the table, a motive device supported independently of the table, and actuating connections between said motive device and the manipulator, said connections permitting the operation of the manipulator in the different adjusted positions of the table, substantially as described.

14. In a rolling mill, the combination with a table mounted for both lateral and vertical movements, of a manipulator carried by said table and movable therewith, said manipulator having means for turning the ingot upon the table, a motive device supported independently of the table, and actuating connections between said motive device and the manipulator, said connections permitting the operation of the manipulator in the different adjusted positions of the table, the table having a relatively fixed guide at one side of the manipulator, and a movable guide at the other side of the manipulator, and actuating connections whereby the movable guide may be moved with the table and also independently of the table toward and away from the relatively fixed guide, substantially as described.

15. In a rolling mill, an overhead support, a table suspended from said support for both vertical and lateral movement relative to the rolls, lever members from which the table is suspended, manipulator mechanism carried by the table, and a manipulator-actuating member carried by one of said lever members, substantially as described.

16. In a rolling mill, a mill table, means for suspending said table whereby it may be moved both laterally and vertically, actuating connections for effecting a lateral shifting of the table, other actuating connections for effecting a vertical shifting of the table, and manipulator mechanism mounted on the table and movable therewith, said manipulator having means for turning the work-piece on the table, together with separate actuating mechanism for actuating the manipulator mechanism in the different positions of the table, substantially as described.

In testimony whereof, I have hereunto set my hand.

JULIAN KENNEDY.